United States Patent [19]

Yuchi

[11] Patent Number: 4,616,138

[45] Date of Patent: Oct. 7, 1986

[54] ANALOG-TYPE FIRE DETECTOR

[75] Inventor: Sadataka Yuchi, Sagamihara, Japan

[73] Assignee: Hochiki Corporation, Tokyo, Japan

[21] Appl. No.: 672,834

[22] Filed: Nov. 19, 1984

[30] Foreign Application Priority Data

Nov. 29, 1983 [JP] Japan .............................. 58-225255

Apr. 27, 1984 [JP] Japan .............................. 59-85604

[51] Int. Cl.[4] .............................................. G06K 7/10

[52] U.S. Cl. ....................................... 250/554; 431/24

[58] Field of Search ................... 250/554, 577, 214 R; 431/79, 24

[56] References Cited

U.S. PATENT DOCUMENTS 4,381,455 4/1983 Komori .............................. 250/554

*Primary Examiner*—Gene Wan

*Attorney, Agent, or Firm*—Lackenbach Siegel Marzullo Presta & Aronson

[57] ABSTRACT

An analog-type fire detector for detecting, in the form of an analog amount, a change in physical phenomena caused by occurrence of a fire, which intermittently detects a change in the ambient physical phenomena caused by occurrence of a fire, generates an analog signal corresponding to an amount of the change, converts the analog signal into a pulse signal of a duration corresponding to the level of the signal, generates periodically from a reference pulse generating means a reference pulse of a predetermined duration, detects by a discriminating means a difference in pulse durations between the output signal from the pulse duration converting means and the reference pulse, charges or discharges a capacitor corresponding to the difference detected, and hold-outputs for a predetermined period by a hold-outputs means a signal corresponding to a voltage across the capacitor at the time when the charging or discharging is stopped.

10 Claims, 9 Drawing Figures

ANALOG-TYPE FIRE DETECTOR

BACKGROUND OF THE INVENTION

This invention relates to an analog-type fire detector which detects, as an analog amount, a change in physical phenomena caused by a fire.

In a conventional fire detector, for example in a photoelectric fire detector, to reduce current consumption, a light emitting device is intermittently driven with a period of for example 2 sec, a change of the light from the light emitting device caused by incoming smoke is detected by a photodetector, the photodetection signal is compared with a predetermined threshold value within the light emission drive period, and a switching device is operated when the photodetection signal exceeds the threshold value to lower the impedance between power/signal lines derived from a central signal station to short-circuit therebetween so as to allow an alarming current to be transmitted to the central signal station.

However, it is difficult in the conventional fire detector of this type to accomplish both earlier finding of a fire and prevention of mis-alarming due to its fire detection system by a fixed threshold value. It is also difficult to grasp the status of a fire. In this connection, it has recently been proposed to detect, in the form of an analog amount, a change of smoke density caused by a fire to transmit it to a central signal station so that the signal station can make fire determination based on the analog data.

In such an analog-type fire alarm system, to reduce current consumption, smoke density is usually detected intermittently and the detection operation time is usually as short as about 0.2 msec. Therefore, if the detection output is transmitted to the central signal station as it is, the central signal station cannot surely receive the signal. To solve this problem, it is possible to extend the detection operation time of the fire detector longer than the time for which the central signal station can receive the detection output. In this case, however, an essential object of reducing current consumption cannot be attained. In addition, there has been such a problem that a noise is possibly mingled with data of early detection stage which prevents accurate detection of a fire, causing possible misoperation.

More specifically, in a conventional photoelectric analog-type smoke detector which optically detects smoke density due to a fire and outputs an analog detection signal corresponding to the density of smoke, a pulse duration converting circuit for converting the detection signal into a pulse signal of a pulse duration corresponding to the signal level so as to transmit the analog detection signal in the form of digital data to the central signal station.

This pulse duration converting circuit is generally formed in such a manner that the detection signal and a triangular-wave signal of a predetermined frequency are input to a comparator to obtain a pulse signal having a pulse duration corresponding to the detection signal level by changing the threshold level to the triangular-wave signal by the detection signal.

However, such a conventional pulse duration converting circuit needs a triangular-wave oscillation circuit for generating the triangular-wave signal which is used as a reference for the pulse duration conversion and the circuit arrangement thereof is very complicated, raising the cost thereof.

SUMMARY OF THE INVENTION

This invention is therefore achieved to obviate the problems involved in the conventional techniques.

It is an object of the present invention to provide an analog-type fire detector which can hold a detected analog output for a predetermined period when the detection operation is not carried out, instead of prolonging the detection operation time and thereafter transmit the output to a central signal station so as to save current consumption, and which can cut off an early output portion which possibly contains noise components and utilise a later output portion for fire detection to ensure accuracy of the fire detection.

It is another object of the present invention to provide an analog-type fire detector which is capable of effecting pulse duration conversion corresponding to the detection signal level by a simple circuit arrangement, letting a light emitting device be intermittently driven by a pulse power and letting scattered light corresponding to the smoke density be incident on a photodetector to cause a photodetection current so as to obtain a pulse duration conversion signal having a pulse duration corresponding to the smoke density.

In accordance with the present invention, there is provided an analog-type fire detector for detecting a change in physical environment caused due to occurrence of a fire, which comprises:

- a detecting means for intermittently detecting an amount of a change in ambient physical phenomena due to an occurrence of a fire to generate an analog signal corresponding to the change amount;
- a pulse duration converting means for converting said analog signal into a pulse signal having a duration corresponding to the level of the signal;
- a reference pulse generating means for generating a reference pulse having a predetermined duration with a predetermined period in correspondence to the detection operation of said detecting means;
- a discriminating means for detecting a difference in pulse durations between an output signal from the pulse duration converting means and the reference pulse upon comparison thereof;
- a charge-and-discharge means for charging or discharging a capacitor corresponding to the difference detected by the discriminating means; and
- a hold-output means for holding and outputting, for a predetermined time, a signal corresponding to a voltage across the capacitor when the charging or discharging in said charge-and-discharge means is stopped.

DESCRIPTION OF THE PREFERRED EMBODIMENTS

Figure 1:
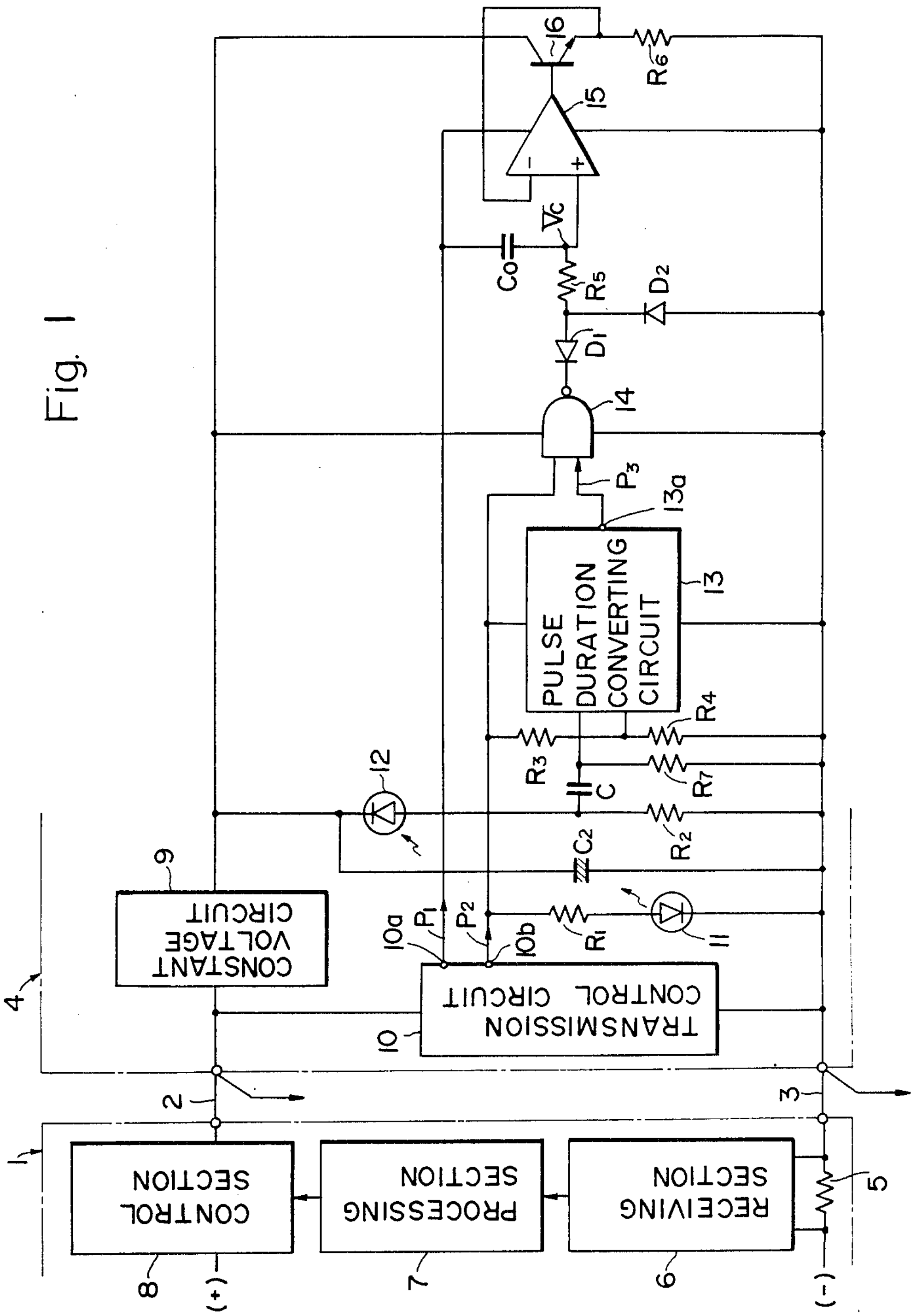
FIG. 1 is a circuit diagram of one form of analog-type photoelectric fire detector embodying the present invention.

Referring now to the drawings, there will be described preferred embodiments of the present invention.

FIG. 1 illustrates one preferred form of analog-type photoelectric fire detector embodying the present invention. 1 is a central signal station and 2 and 3 are a pair of power/signal lines derived from the central signal station 1. A plurality of fire detectors (representatively shown by 4 in FIG. 1) are connected in parallel with each other to the power/signal lines 2 and 3.

The central signal station 1 includes a power detecting resistor 5 for detecting a change in a line current output from the fire detector 4, a receiving section 6 for receiving the detection voltage obtained by the power detecting resistor 5, a processing section 7 for carrying out fire determination processing on the basis of the analog signal received by the receiving section 6 and a control section 8 for controlling the calling of fire detectors connected to the central signal station 1.

In each of the fire detectors 4, 9 is a constant-voltage circuit which is supplied with power from the central signal station 1 to power the circuits within the fire detector 4, 10 is a transmission control circuit which outputs, from its output 10*a*, a pulse signal P1 for setting a response time when called from the control section 8 of the central signal station 1 and outputs, from its output 10*b*, a light emission drive pulse P2. A series circuit of a resistor R1 and a light emitting device 11 is connected between a signal line derived from the terminal 10*b* of the transmission control circuit 10 and the common line and a series circuit of a photodetector 12 and a resistor R2 is connected between the output of the constant-voltage circuit 9 and the common line so that light from the light emitting device 11 which is scattered by entering smoke may be incident on the photodetector 12.

13 is a pulse duration converting circuit which receives a photodetection signal of a voltage developed at the load resistor R2 connected in series with the photodetector 12 which is corresponding to the density of the smoke and a reference voltage divided by resistors R3 and R4 through a differentiating circuit comprised of a capacitor C and a resistor R7. The pulse duration converting circuit 13 outputs from its output terminal 13*a* a pulse signal P3 having a pulse duration covering a period when the photodetection signal exceeds the reference voltage. More specifically, the pulse duration converting circuit 13 outputs the pulse signal P3 having a pulse duration corresponding to the photodetection signal level and the power to the pulse duration converting circuit 13 is supplied by the light emission drive pulse P2 from the transmission control circuit 10 so that it outputs the pulse signal P3 within the light emission period of the light emitting device 11.

After the pulse duration converting circuit 13, a charge-and-discharge circuit is provided. The charge-and-discharge circuit comprises a NAND gate 14, diodes D1 and D2, a resistor R5 and a capacitor C0. The NAND gate 14 receives as inputs thereto the light emission drive pulse P2 from the transmission control circuit 10 and the pulse signal from the pulse duration converting circuit 13, and outputs an inverted logic product of the inputs. Between the output of the NAND gate 14 and a signal line derived from the terminal 10*a* of the transmission control circuit 10, a series circuit comprising the capacitor C0, the resistor R5 and the diode D1 is connected and forms a charge circuit for charging the capacitor C0 when the output of the NAND gate 14 is low. Between the junction of the diode D1 and the resistor R5 and the common line, the diode D2 is connected reversely so that the capacitor C0 discharges through the diode D2 when the pulse signal P1 of the transmission control circuit 10 is removed.

The capacitor terminal voltage Vc at the junction of the capacitor C0 and the resistor R5 is applied to a positive input terminal of an operational amplifier 15 constituting a hold-output circuit. The output of the operational amplifier 15 is connected to a transistor 16 whose collector and emitter are connected between the power/signal lines 2 and 3. The emitter of the transistor is connected to a resistor R6 for detecting a current and the voltage detected by the resistor R6 is fed back to the negative input terminal of the operational amplifier 15 so as to form a constant current control circuit for controlling the current of the transistor 16 to be a current corresponding to the capacitor terminal voltage Vc by the detection voltage of the resistor R6.

The pulse duration converting circuit 13 will now be described in detail referring to FIG. 2. A capacitor C2 is connected in parallel with a series circuit of the photodetector 12 and the load resistor R2 so as to suppress a voltage change which will possibly be caused when the photodetector 12 causes a photodetection current upon receipt of intermittent light.

After the load resistor R2, a differentiating circuit comprising a capacitor input with a voltage across the load resistor R1 and a resistor R7 is provided. The output of the differentiating circuit, i.e. a voltage across the resistor R7, is applied to one of the input terminals, 24, of a comparator 23. The other input terminal 25 is applied with a reference voltage Vr obtained by the dividing circuit comprising the resistors R3 and R4. This reference voltage Vr is also generated intermittently upon supply of the pulse P2.

The comparator circuit 23 is preferably of high speed having high input impedance and has a differential amplifier circuit provided with MOSFETs 26 and 27 at an input stage. The MOSFETs 26 and 27 are driven by a constant current source 28. The comparator 23 is intermittently operated upon supply of the drive pulse P2 through the transmission control circuit 10. The comparator circuit 23 further has at the input stage thereof zener diodes ZD1, ZD2 and ZD3 for input protection. In especial, the zener diodes ZD1 and ZD2 are connected between the constant current source 28 and the differentiating circuit of the photodetecting side. In this connection, it is to be noted that the zener diode ZD1 has a very small junction capacitance Cj generated by the reverse-biased PN junction of the zener diode ZD1 because it is reversely biased when the comparator circuit 23 operates by the pulse P2. Due to the presence of the small junction capacitance Cj of the zener diode ZD1, a very small current is allowed to flow from the comparator circuit 23 side to the differentiating circuit and the load resistor R2 by the charging and discharging of the junction capacitor Cj when the drive pulse P2 is supplied to the comparator circuit 23.

In this connection, it is further to be noted that the circuit constants are so determined that the time constants determined by the small junction capacitor Cj and the parallel resistance value of the load resistors R2 and R7 may be $10^{-7}$ to $10^{-5}$.

The operation of the comparator circuit 23 will now be described referring to FIG. 3.

Figure 3:
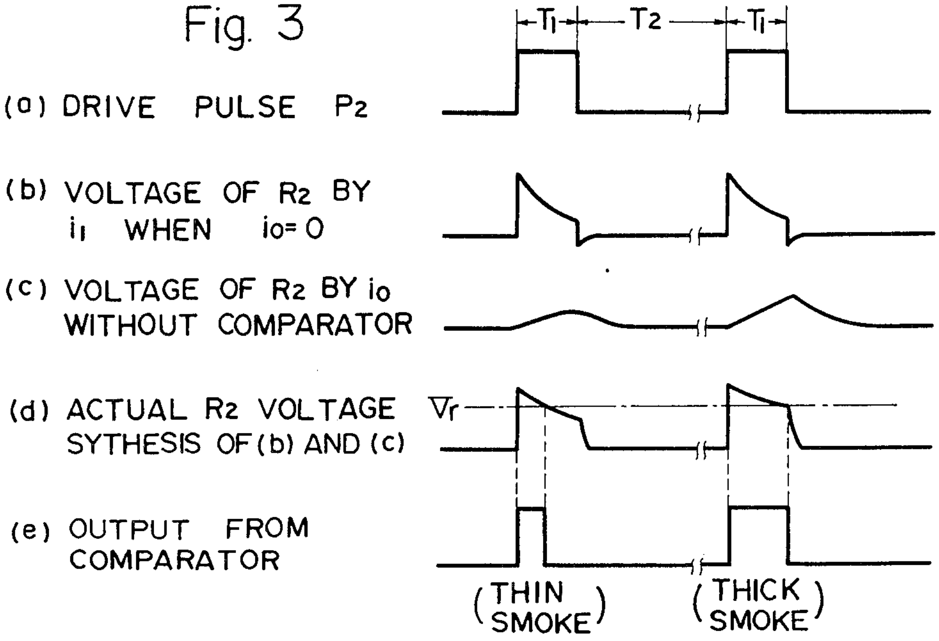
FIG. 3 is a diagram of signal waveforms of the circuit of FIG. 2.

The light emitting device 11 is driven by the drive pulse P2 having a pulse duration T1 and a pulse interval T2 as shown in FIG. 3(*a*). The pulse duration T1 of the drive pulse P2 is about 100 to 200 μsec and the interval T2 of the pulse P2 is determined considering the number of the fire detectors connected to the central signal station, current to be consumed and the detection accuracy required. The same drive pulse P2 having the pulse duration T1 and the pulse interval T2 is also supplied to the comparator circuit 23.

The voltage developed at the load resistor R1 when no scattered light is incident on the photodetector 12, i.e. the photodetection current i0=0 is as follows. Even when the photodetection current i0=0, a current by the charging and discharging of the junction capacitor Cj due to pulse power supply to the comparator 23 flows through the resistor R7 of the differentiating circuit and the load resistor R2, so that the voltage across the load resistor R2 due to a small current i1 flowing from the comparator circuit 23 to the load resistor R2 is in the form of a differentiation waveform of the power source pulse as shown in FIG. 3(*b*). If the time constants of the junction capacitor Cj and the resistors R2 and R7 are set to be $10^{-5}$ or less, there can be obtained a voltage which reduces at a constant gradient from the rising of the pulse power source.

The voltage at the load resistor R2 by the photodetection current i0 when no comparator circuit 23 is connected is as shown in FIG. 3(*c*). When the photodetection current is as small as i0=i01, the voltage developed at the load resistor R2 is small and the photodetection current i0 becomes as large as i0=i02, the voltage developed at the load resistor R2 becomes large. The voltage actually developed at the load resistor R2 is a synthetic voltage of the voltages of FIG. 3(*b*) and (*c*). Since the signal voltage developed at the load resistor R2 by the junction capacitor Cj as shown by FIG. 3(*b*) is constant but the photodetection current i0 is varied depending on the smoke density as shown by FIG. 3(*c*), the actual voltage of the load resistor R2 obtained by the synthesis of (b) and (c) is a signal voltage which rises to a predetermined voltage level in synchronism with the rising of the drive pulse P2 and falls at gradients determined by the photodetection current i.e. smoke density. Similar voltage is also developed at the resistor R7 and as shown by FIG. 3(*e*) compared with the reference voltage Vr at the comparator circuit 23. When the photodetection current i0 is small and the voltage has an abrupt gradient, there can be obtained a comparator output of short pulse duration. On the other hand, when the photodetection current i0 is large and the gradient is gentle, the comparator output obtained has a long pulse duration. Thus, there can be obtained a pulse duration signal corresponding to the photodetection current i0.

In a modification of the present embodiment, a comparator circuit having no input protecting zener diode ZD1 at the input stage of the comparator circuit may be employed. In this case, a capacitor having a very small capacitance Cj' is connected between the transmission control circuit 10 and the differentiating circuit as shown by a broken line in FIG. 2.

More specifically, when the MOSFETs 26 and 27 employed in the comparator circuit 23 has thick metal oxide films, the input protection by the zener diode is not necessitated and the junction capacitance of the input protecting zener diode can not be utilized. In such a case, a capacitor imparting a very small capacitance Cj' as shown in FIG. 2 may be connected between the pulse power source and the differentiating circuit. The capacitor may be provided within IC forming the comparator circuit.

The relationship between the junction capacitance Cj of the zener diode or the small capacitance Cj' imparted by the capacitor as described above and the pulse duration of the pulse duration conversion signal obtained from the output from the comparator circuit 23 will now be described referring to the signal waveforms of FIG. 4.

Figure 2:
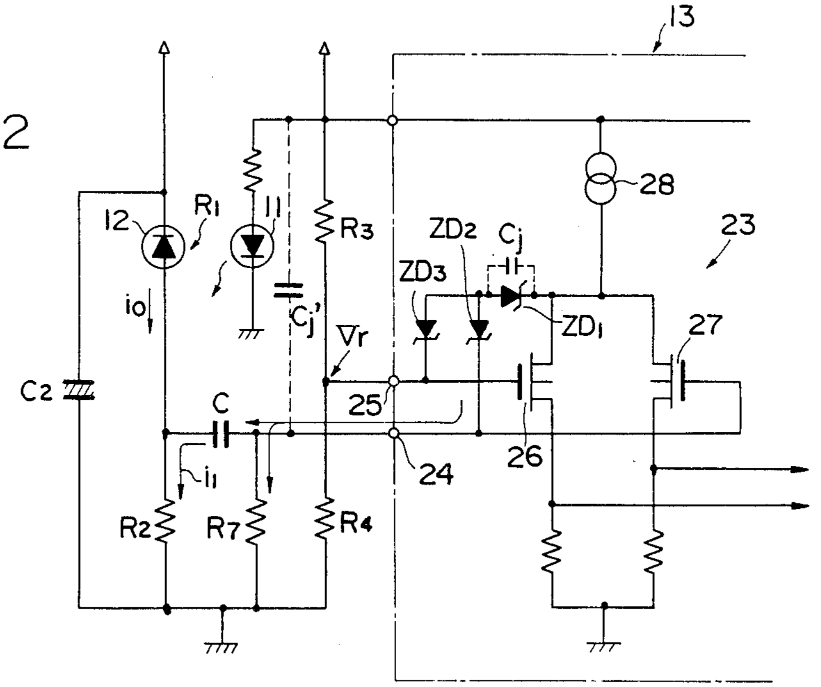
FIG. 2 is a circuit diagram of one form of a pulse duration converting circuit having a capacitor of a very small capacitance.
Figure 4:
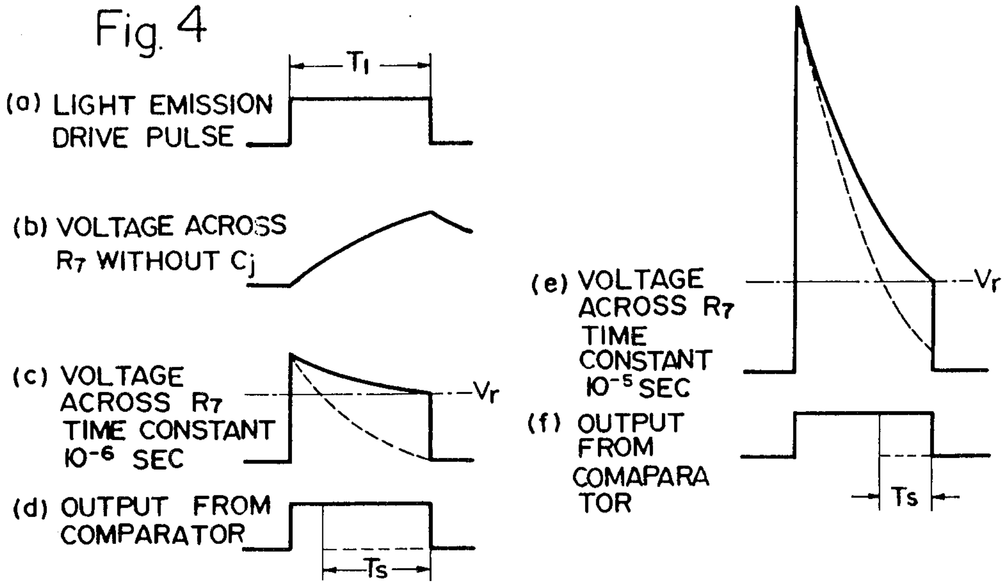
FIG. 4 is a diagram of signal waveforms showing a relationship between the capacitor and the pulse duration change.

FIG. 4 shows signal waveforms when the time constant of the circuit of FIG. 2 are $10^{-6}$ sec and $10^{-5}$ sec.

FIG. 4(*a*) shows a light emission drive pulse P2 from the transmission control circuit 10 which has a pulse duration T1. The pulse duration T1 is for example 150 μsec.

FIG. 4(*b*) shows a voltage across the resistor R7 when no small capacitance Cj is provided. In this case, only a change corresponding to the photodetection current appears.

FIG. 4(*c*) shows a voltage across the resistor R7 when the time constant is $10^{-6}$ sec. The broken line shows a voltage change when the smoke density is zero. The smoke densities causing voltage changes from the falling portion shown by the solid line to the reference voltage Vr can be converted into changes in pulse duration. The change width Ts appearing in the output from the comparator circuit 23 is realized as a sufficient pulse duration change such as about 75%, i.e. $\frac{3}{4}$, of the pulse duration T1 of the drive pulse P2.

FIG. 4(*e*) shows a terminal voltage of the resistor R2 when the time constant is $10^{-5}$ sec. In this case, the change width Ts is about $\frac{1}{3}$ of the pulse duration T1 of the light emission drive pulse. The change in the pulse duration becomes larger as the value of the small capacitance Cj becomes smaller.

In the foregoing examples, the time constant is adjusted so that the output from the comparator circuit 23 may be zero when the smoke density is zero.

The entire operation of the embodiment of FIG. 1 will now be described referring to the signal waveforms of FIG. 5.

The control section 8 of the central signal station 1 calls the smoke detectors 4 with a predetermined period T3 (the period T3 is for example 2 seconds). The calling from the central signal station 1 is effected by predetermined calling codes or by counting clock pulses output from the control section 8 at the side of the smoke detectors 4. When the transmission control circuit 10 of the smoke detector 4 identifies the calling thereto by the calling from the signal station, the transmission control circuit 10 outputs from the terminal 10*a* thereof a pulse signal P1 representing a period T0 for determining a response time (for example T0=4 ms) and outputs from the terminal 10*b* thereof a light emission drive pulse P2 representing a period T1 (the period T1 is for example 0.2 ms). As a result, the light emitting device 11 is driven to emit light for a period of 0.2 ms by the light emission drive pulse P2. Scattered light corresponding to the smoke density at that time is incident on the photodetector 12 so as to supply the photodetection output corresponding to the smoke density to the pulse duration converting circuit 13. If the density of smoke entering the smoke detector 4 is low, the period of the photodetection signal exceeding the reference voltage divided by the resistors R3 and R4 is short and the pulse duration converting circuit 13 outputs a pulse signal P3 representing a pulse duration Ta to the NAND gate 14. The level of the pulse signal P3 is reversed from that shown in FIG. 2 and FIG. 3. Before receiving the calling from the central signal station 1, in the NAND gate 14, the inputs P1 and P2 are at low levels and P3 is at a H level. Upon calling from the central signal station, the transmission control circuit 10 outputs the light emission drive pulse P2 of H level and the pulse duration converting circuit 13 outputs the pulse signal P3 of L level so that the output of the NAND gate 14 remains at the H level. Thereafter, when the pulse signal P3 from the pulse duration converting circuit 13 is removed after a period of Ta, the output of the NAND gate 14 falls to the L level, and the capacitor C0, the resistor R5, the diode D1 and the NAND gate 14 constitute a charging circuit for the capacitor C0. Immediately before starting the charging, the voltage Vc across the capacitor C0 is at a voltage level of the pulse signal P1 from the transmission control circuit 10. When the charging of the capacitor C0 has been started, the voltage Vc is lowered at a time constant determined by the capacitor C0 and the resistor R5. During the period when the voltage Vc is reduced due to the charging of the capcitance C0, when a time T2 has been passed from the calling, the output of the light emission drive pulse P2 from the transmission control circuit 10 is removed, so that the output of the NAND gate 14 is again inverted to H level. As a result, the charging of the capacitor C0 is stopped and a line current corresponding to the voltage Vc across the capacitor C0 when the charging is stopped is hold-output to the central signal station 1 by the operational amplifier 15 and the transistor 16 within a period when the light emission is stopped. After a time T1=4 msec has been passed from the calling, the pulse signal P1 from the transmission control circuit 10 is removed and the hold-output by the operational amplifier 15 and the transistor 16 is released, so that the capacitor C0 discharges through the diode D2 to be restored to the initial state.

On the other hand, at the receiving section 6 of the central signal station, the current hold-output from the transistor 16 of the smoke detector 4 at a timing of T4 from the stop of the output of the light emission drive pulse P2 after calling until the stop of the output of the pulse P1 is received after conversion into a voltage at the current detecting resistor 5. The received current is converted into a digital form and supplied to the processing section 7. Thus, fire determination is carried out based on the analog output from the smoke detector 4 corresponding to the smoke density.

Figure 5:
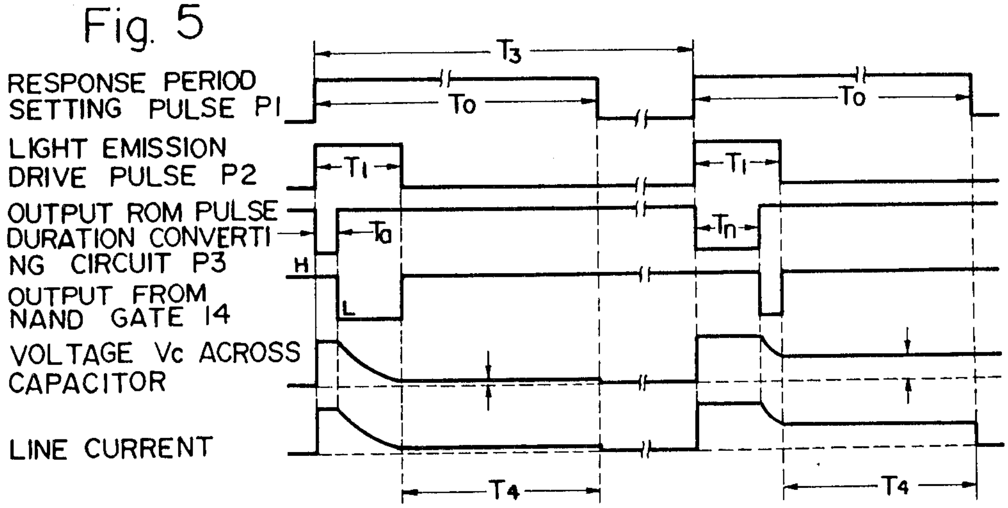
FIG. 5 is a diagram of signal waveforms of various portions of the circuit as shown in FIG. 1.

Subsequently, if the density of smoke entering the detector 4 is increased in the succeeding calling period, the pulse duration of the pulse signal P3 output from the pulse duration converting circuit 13 is increased to Tn as shown in FIG. 5 and the charging time of the capacitor C0 from the cut off of the output of the pulse signal P3 till the stop of the light emission drive pulse P2. As a result, the voltage Vc when the charging of the capacitor C0 is stopped becomes higher as the smoke density increases and the operational amplifier 15 and the transistor 16 hold-output a line current corresponding to the voltage Vc across the capacitor which is increased according to the pulse duration Tn for a period of T4.

As described above, in the embodiment of FIG. 1, light is intermittently emitted upon calling from the central signal station 1 and received to cause a photodetection signal, the signal is converted into a pulse signal having a pulse duration corresponding to the photodetection signal level, charging of a capacitor is started since the output of the pulse signal has been stopped and the charging is stopped when the light emission drive is finished and the reference pulse or light emission drive pulse falls, and a current corresponding to the voltage across the capacitor when the charging is stopped is hold-output. With this arrangement, the central signal station 1 can receive, upon calling thereby, an analog detection signal corresponding to the smoke density in a period when light emission is stopped. Since the light emitting period is not changed, current consumption by the smoke detector can be saved. In addition, since the hold-output period in the period when the light emission is stopped is set sufficient for the central signal station 1 to receive the output, the photodetection signal obtained from the intermittent light emission of a short period of time can be positively received by the central signal station without influence of noises which enables accurate fire determination.

Figure 6:
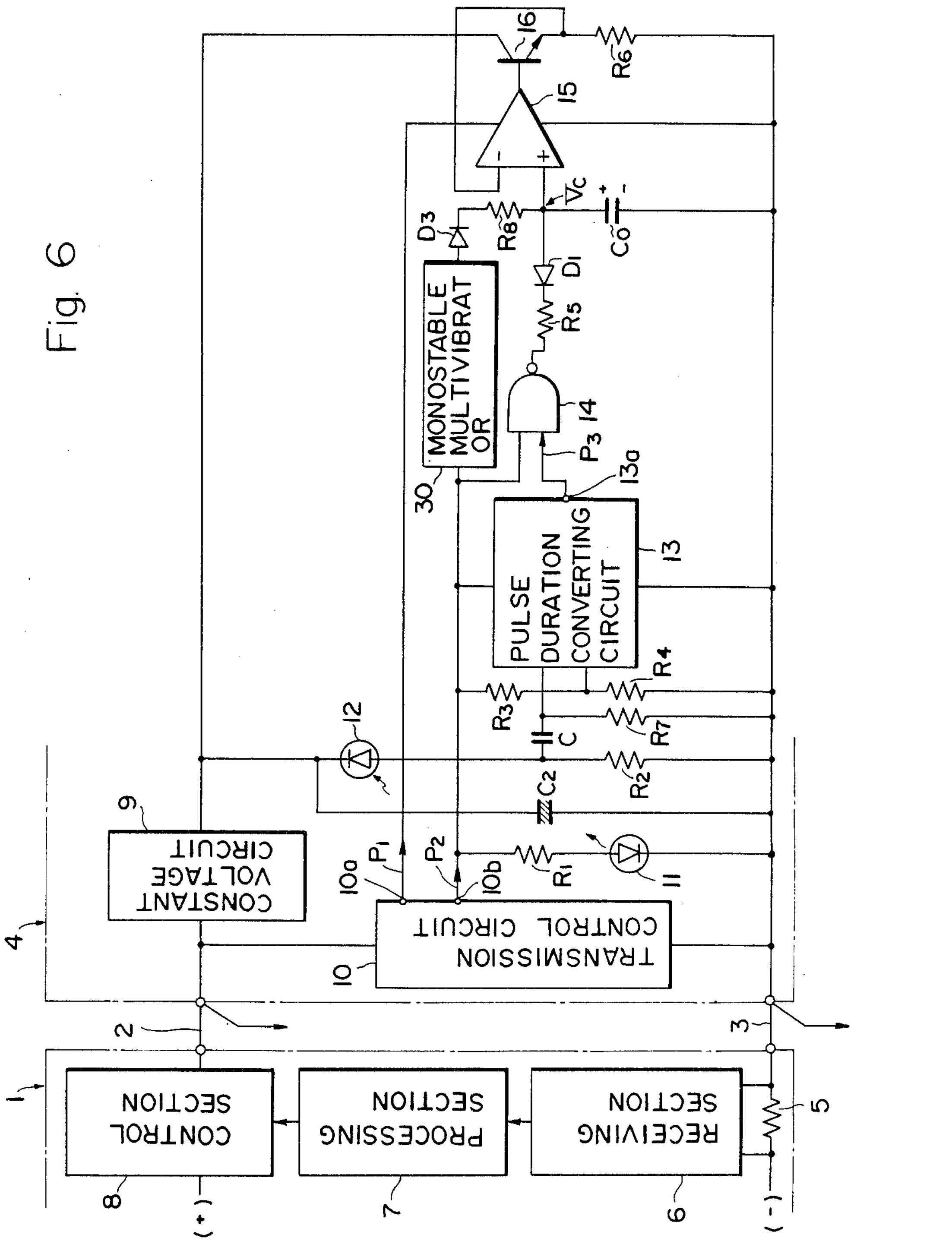
FIG. 6 is a circuit diagram of another form of analog-type photoelectric fire detector embodying the present invention.

FIG. 6 is a circuit block diagram showing another form of an analog-type fire detector according to the present invention. Although the hold-output is effected corresponding to the voltage across the capacitor C0 when the charging of the capacitor is stopped in the embodiment of FIG. 1, the hold-output is effected by a voltage across the capacitor C0 when the capacitor is discharged in this embodiment.

More specifically, a series circuit of a capacitor C0, a diode D1 and a resistor R5 is connected between the output of the NAND gate 14 and the common line, and a monostable multivibrator 30 is connected to a junction of the diode D1 and the capacitor C0 to rapidly making charge by the rising of the light emission drive pulse P2 from the transmission control circuit 10 through the capacitor C0, a diode D3 and a resistor R8.

Figure 7:
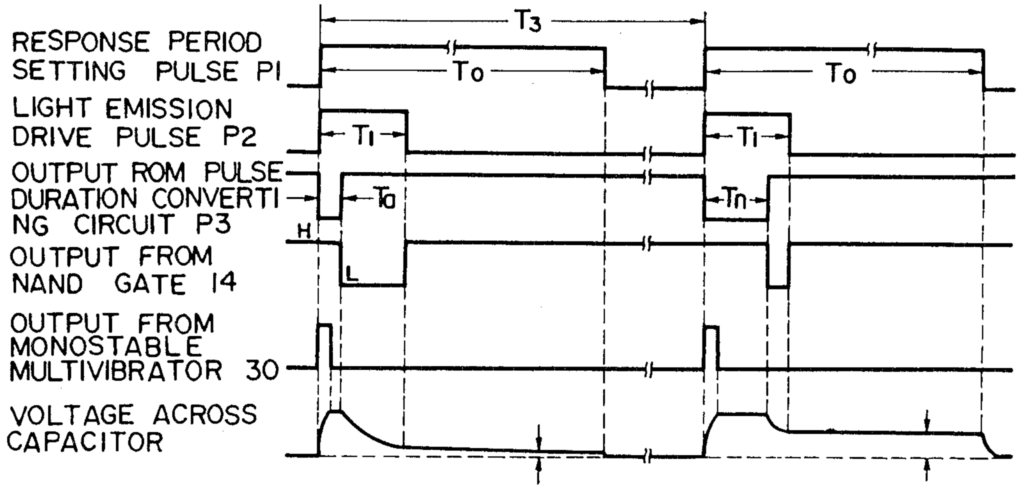
FIG. 7 is a diagram of signal waveforms of the circuit of FIG. 6.

The operation of the embodiment of FIG. 6 will now be described referring to FIG. 7.

When a pulse P1 for setting a response time and a light emission drive pulse P2 are output from a transmission control circuit 10 upon calling from the central signal station 1, the capacitor C0 is charged to a pulse voltage by the output from the monostable multivibrator 30 due to the light emission drive pulse P2. At the same time, the pulse duration converting circuit 13 outputs a pulse signal P3 having a pulse duration corresponding to the smoke density. Since the output of the NAND gate 14 is at H level, the voltage Vc across the capacitor C0 charged at the pulse voltage is at a predetermined level. When the pulse output from the pulse duration converting circuit 13 is removed, the output of the NAND gate 14 is inverted to L level and the capacitor C0 starts to discharge through the diode D1 and the resistor 5. The discharge of the capacitor CO is completed after T2 from the calling to the smoke detector 4 when the light emission drive pulse P2 is removed. The voltage Vc across the capacitor when the capacitor C0 stops its discharging becomes a voltage corresponding to the smoke density, and a current corresponding to the voltage Vc is hold-output to the central signal station 1 by the operational amplifier 15 and the transistor 16 for a period from the stop of the light emission and the removal of the pulse signal P1.

In brief, a difference between the light emission drive pulse P2 as a reference pulse and the output P3 from the pulse duration converting circuit is detected and the voltage across the capacitor C0 is determined by the detected difference so as to hold-output the same.

Figure 8:
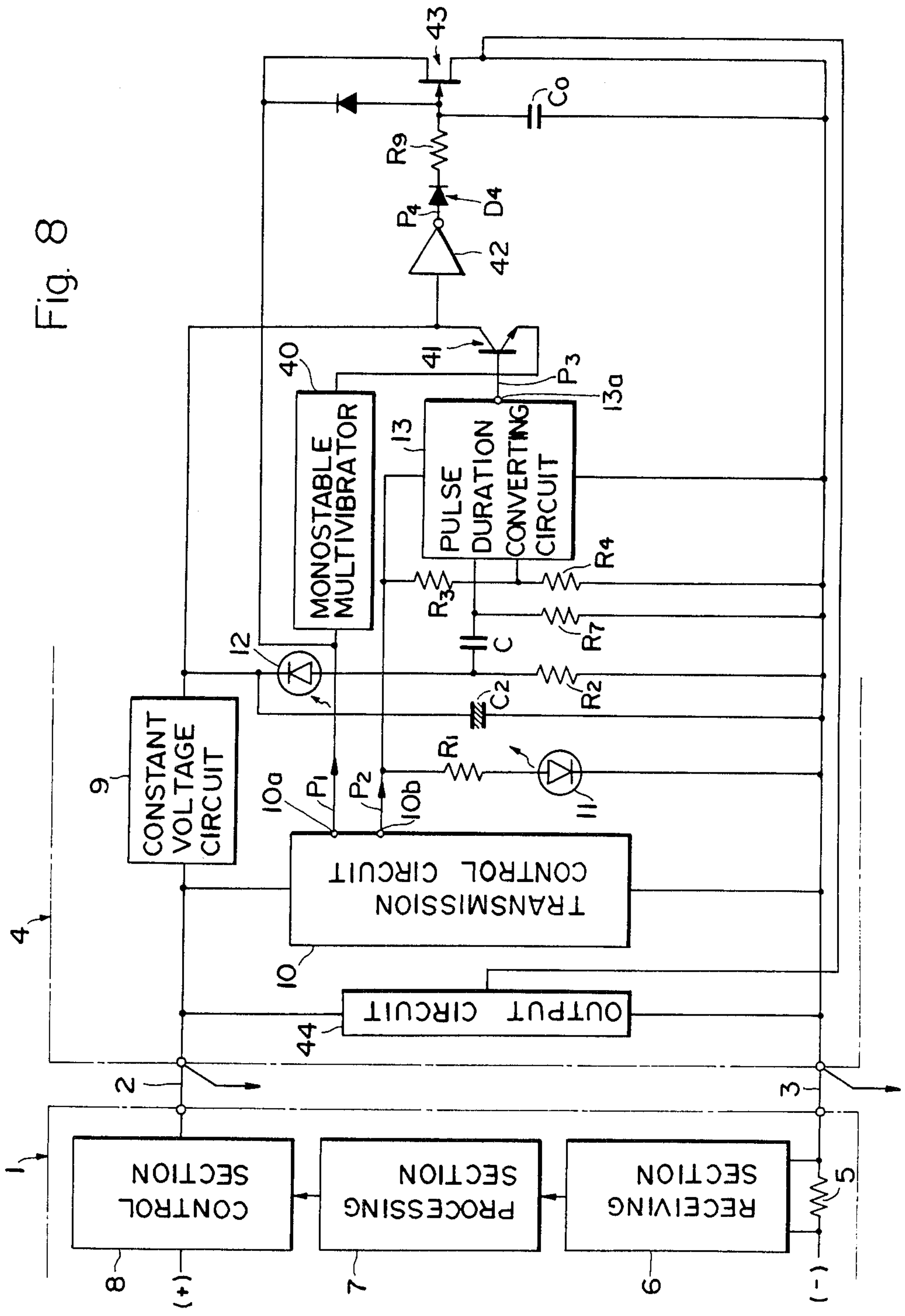
FIG. 8 is a circuit diagram of a further form of analog-type photoelectric fire detector embodying the present invention.

FIG. 8 is a still another embodiment of the present invention. The output from the pulse duration converting circuit 13 and the output from a monostable multivibrator 40 is compared to detect a difference therebetween and the capacitor C0 is charged according to the difference to hold-output the voltage across the capacitor.

More particularly, a transistor 41 functioning as a discriminating means is connected in such a manner that the gate thereof is coupled to the pulse duration converting circuit 13, the emitter thereof is coupled to the monostable multivibrator 40 and the collector thereof is coupled to a series circuit of an inverter 42, a diode D4, a resistor R9 and the capacitor C0. The capacitor C0 starts charging when the output from the monostable multivibrator 40 which is input to the transistor 41 falls and stops the charging when the output P3 from the pulse duration converting circuit 13 falls. A field-effect transistor 43 and an output circuit 44 are further connected to constitute a hold-output means.

Figure 9:
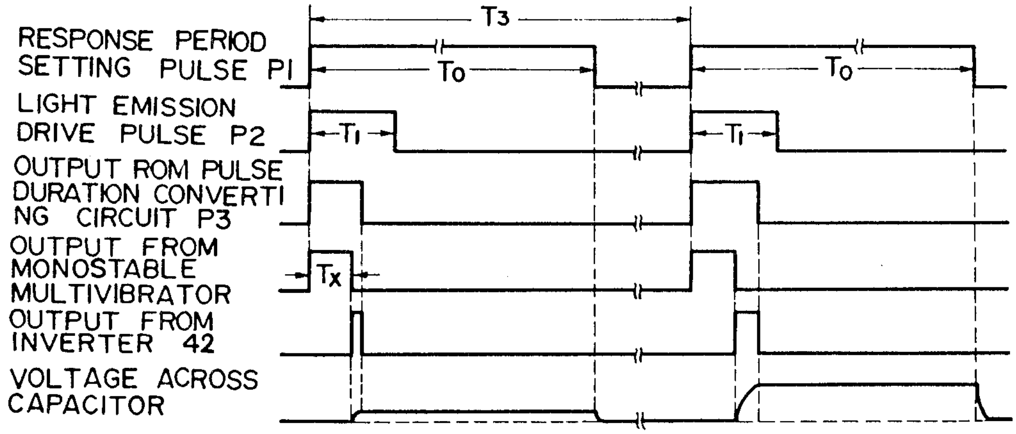
FIG. 9 is a diagram of signal waveforms of the circuit of FIG. 8.

The charge-and-discharge operation of the embodiment of FIG. 8 will be described referring to FIG. 9. Upon calling from the central signal station 1, a signal P1 for setting a response time and a light emission drive pulse P2 are output from the transmission control circuit 10, and the monostable multivibrator 40 outputs by the signal P1, a pulse having a duration Tx which is a half of the duration T1 of the drive pulse P2. At the same time, a signal P3 having a duration corresponding to the smoke density is output from the pulse duration converting circuit 13. The transistor 41 is not rendered conducting even if the signal P3 is applied to the gate because the output pulse from the monostable multivibrator 40 is input to the emitter and it becomes conductive when the output pulse from the monostable multivibrator 40 falls. The inverter 42 outputs a pulse signal P4 having a duration equal to a difference in pulse durations between the signal P3 and the output pulse from the monostable multivibrator 40. The capacitor C0 is rapidly charged from the rising of the pulse signal P3 and stops its charging at the falling of the pulse signal P4. The voltage across the capacitor when the charging thereof is stopped is held until the falling of the response time setting pulse P1 and hold-output to the central signal station 1 from the output circuit 44.

In this embodiment, a portion of the output from the pulse duration converting circuit 13 corresponding to the pulse duration Tx of the output from the monostable multivibrator 40 in which noise components are possibly contained is cut off. The remaining portion is used for fire detection so that accurate fire determination can be realized.

Although the analog-type fire detectors of the foregoing embodiments are all applied to photoelectric type fire detectors, the analog-type fire detector of the present invention can also be applied another type of fire detector.

We claim:

1. An analog type fire detector for detecting a change in physical environment caused due to occurrence of a fire, which comprises:

a detecting means for intermittently detecting an amount of a change in ambient physical phenomena due to an occurrence of a fire to generate an analog signal corresponding to the change amount;

a pulse duration converting means for converting said analog signal into a pulse signal having a duration corresponding to the level of the signal;

a reference pulse generating means for generating a reference pulse having a predetermined duration with a predetermined period in correspondence to the detection operation of said detecting means;

a discriminating means for detecting a difference in pulse durations between an output signal from the pulse duration converting means and the reference pulse upon comparison thereof;

a charge-and-discharge means for charging or discharging a capacitor corresponding to the difference detected by the discriminating means; and a hold-output means for holding and outputting, for a predetermined time, a signal corresponding to a voltage across the capacitor when the charging or discharging in said charge-and-discharge means is stopped.

2. An analog type fire detector as claimed in claim 1, wherein said reference pulse generating means generates a reference pulse having a duration of the intermittent drive period of the detecting means or more.

3. An analog type fire detector as claimed in claim 1, wherein said reference pulse generating means generates a reference pulse having a duration less than the intermittent drive period of said detecting means and corresponding to a width of a noise component possibly contained in the output signal from said pulse duration converting means.

4. An analog type fire detector as claimed in claim 2, wherein said discriminating means is a NAND gate which is input with said reference pulse and said output signal from said pulse duration converting means, said charge-and-discharge means is formed of a diode, a resistor and a capacitor which are connected serially to the output of said NAND gate, said hold-output means is formed of an operational amplifier and a transistor connected to said charge-and-discharge means and adapted to start charging when the output from said pulse duration converting means is cut off, stop the charging when said detecting means completes its detection operation and hold-output said signal corresponding to the voltage across the capacitor for a period when said detecting means stops its operation.

5. An analog type fire detector as claimed in claim 2, wherein said discriminating means is a NAND gate to which said reference pulse and said output signal from said pulse duration converting means are input, said charge-and-discharge means is formed of a series circuit of a diode, a resistor and a capacitor and another series circuit of a monostable multivibrator, a diode and a resistor connected in parallel with said first series circuit, said hold-output means is formed of an operational amplifier connected to said charge-and-discharge means and a transistor, said monostable multivibrator is adapted to charge at a high speed as soon as said detecting means starts its operation, said capacitor is adapted to start charging when the output from said pulse duration converting means is stopped and stop the discharging when the detecting means completes its operation to hold-output the signal corresponding to the voltage across the capacitor in a period when said detecting means stops its operation.

6. An analog type fire detector as claimed in claim 3, wherein said reference pulse generating means is a monostable multivibrator for driving said detecting means and generating the reference pulses, said discriminating means is a transistor whose gate is input with the output signal from said pulse duration converting means and whose emitter is input with said reference pulse and which is rendered conductive after the falling of said reference pulse, said charge-and-discharge means is formed of an inverter, a diode, and a capacitor connected to the collector of said transistor, said hold-output means is a field-effect transistor whose gate is connected to said charge-and-discharge means and which is adapted to make said transistor conductive after the falling of the reference pulse, charge the capacitor by a difference detected by said discriminating means and hold-output the signal corresponding to the voltage across the capacitor at the time of charge completion in a period when the detecting means stops its operation.

7. An analog type fire detector as claimed in claim 2 or 3, wherein said detecting means is formed of a light emitting device periodically and intermittently driven to emit light for a predetermined period and a photodetector which outputs photodetection signal corresponding to a change in the light from the light emitting device caused by entering smoke, said pulse duration converting means is formed of a load resistor directly connected to said photodetector, a differentiating circuit comprising a resistor whose input is connected to the voltage across said load resistor and a capacitor, and a very small capacitor whose one input terminal is connected to the reference voltage output of the resistor dividing circuit and whose another input terminal is connected to the output of said differentiating circuit and which is adapted to flow very small current to said resistor of said differentiating circuit and said load resistor by charging and discharging thereof when a pulse power is supplied to drive said light emitting device.

8. An analog type fire detector as claimed in claim 7, wherein the time constant of the parallel resistance value of said load resistor and the resistor of said differentiating circuit and said very small capacitor is less than $10^{-5}$ sec.

9. An analog type fire detector as claimed in claim 7, wherein said very small capacitor is provided in the form of the junction capacitance of a zener diode provided at the input stage of a comparator circuit.

10. An analog type fire detector as claimed in claim 7, wherein said very small capacitor is provided by a capacitor having a very small capacitance connected between the pulse power source and the differentiating circuit when a comparator has no zener diode at the input stage thereof.

* * * * *